(12) United States Patent
Kavaklioglu et al.

(10) Patent No.: US 7,272,531 B2
(45) Date of Patent: Sep. 18, 2007

(54) AGGREGATION OF ASSET USE INDICES WITHIN A PROCESS PLANT

(75) Inventors: Kadir Kavaklioglu, Eden Prairie, MN (US); Steven R. Dillon, White Bear Lake, MN (US); Gregory H. Rome, Maplewood, MN (US); Jon Westbrock, Rosemount, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 11/230,855

(22) Filed: Sep. 20, 2005

(65) Prior Publication Data

US 2007/0067142 A1   Mar. 22, 2007

(51) Int. Cl.
 *G06F 15/00* (2006.01)
(52) U.S. Cl. ............ 702/182; 702/181; 702/183; 702/184; 702/185; 702/186; 702/187; 702/188; 700/108
(58) Field of Classification Search ........ 702/181–188; 700/95–97, 99, 108, 109
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,701,280 A | 10/1972 | Stroman | 73/194 |
| 3,705,516 A | 12/1972 | Reis | 73/659 |
| 3,981,836 A | 9/1976 | Pangle, Jr. et al. | 524/549 |
| RE29,383 E | 9/1977 | Gallatin et al. | 137/14 |
| 4,058,275 A | 11/1977 | Banks et al. | 244/3.15 |
| 4,099,413 A | 7/1978 | Ohte et al. | 374/175 |
| 4,322,976 A | 4/1982 | Sisson et al. | 73/659 |
| 4,337,516 A | 6/1982 | Murphy et al. | 364/551 |
| 4,408,285 A | 10/1983 | Sisson et al. | 364/508 |
| 4,425,798 A | 1/1984 | Nagai et al. | 73/659 |

(Continued)

FOREIGN PATENT DOCUMENTS

CN   1097804   1/1995

(Continued)

OTHER PUBLICATIONS

"GE Predictor™ Services: GE Predictor Services Overview," GE Industrial Systems, available at http://www.geindustrial.com/cwc/services?id=71 on Jul. 18, 2002.

(Continued)

*Primary Examiner*—Hal Wachsman
*Assistant Examiner*—Phuong Huynh
(74) *Attorney, Agent, or Firm*—Marshall, Gerstein & Borun LLP

(57) ABSTRACT

A method of monitoring an entity within a process plant wherein the entity includes a plurality of lower level entities, includes acquiring a plurality of use indices, acquiring a plurality of weighting values, and creating an aggregate use index from a combination of the lower level use indices and weighting values, wherein the aggregate use index represents status information regarding the entity. Each use index pertains to status information regarding one of the plurality of lower level entities, and each weighting value pertains to the importance of a lower level entity among the plurality of lower level entities.

71 Claims, 10 Drawing Sheets

U.S. PATENT DOCUMENTS

| | | | |
|---|---|---|---|
| 4,435,770 A | 3/1984 | Shiohata et al. ............. 364/508 |
| 4,493,042 A | 1/1985 | Shima et al. ................ 364/507 |
| 4,517,468 A | 5/1985 | Kemper et al. .............. 290/52 |
| 4,527,271 A | 7/1985 | Hallee et al. ................. 371/20 |
| 4,530,234 A | 7/1985 | Cullick et al. ................. 73/53 |
| 4,607,325 A | 8/1986 | Horn ............................ 364/151 |
| 4,635,214 A | 1/1987 | Kasai et al. ................. 364/551 |
| 4,642,782 A | 2/1987 | Kemper et al. .............. 364/550 |
| 4,644,478 A | 2/1987 | Stephens et al. ............ 364/550 |
| 4,644,749 A | 2/1987 | Somes .......................... 60/459 |
| 4,649,515 A | 3/1987 | Thompson et al. .......... 364/900 |
| 4,657,179 A | 4/1987 | Aggers et al. ................ 236/51 |
| 4,683,542 A | 7/1987 | Taniguti ...................... 364/508 |
| 4,707,796 A | 11/1987 | Calabro et al. .............. 364/552 |
| 4,734,873 A | 3/1988 | Malloy et al. ................ 364/571 |
| 4,758,964 A | 7/1988 | Bittner et al. ................ 364/508 |
| 4,763,243 A | 8/1988 | Barlow et al. ................ 364/200 |
| 4,764,862 A | 8/1988 | Barlow et al. ................ 364/200 |
| 4,770,543 A | 9/1988 | Burghoff et al. ............. 374/142 |
| 4,777,585 A | 10/1988 | Kokawa et al. .............. 364/164 |
| 4,819,233 A | 4/1989 | Delucia et al. ................ 371/19 |
| 4,831,564 A | 5/1989 | Suga ........................ 364/999.999 |
| 4,843,557 A | 6/1989 | Ina et al. ................ 364/999.999 |
| 4,873,655 A | 10/1989 | Kondraska .................. 364/553 |
| 4,885,694 A | 12/1989 | Pray et al. .............. 364/464.01 |
| 4,885,707 A | 12/1989 | Nichol et al. .......... 364/999.999 |
| 4,907,167 A | 3/1990 | Skeirik ........................ 364/500 |
| 4,910,691 A | 3/1990 | Skeirik ........................ 364/513 |
| 4,922,412 A | 5/1990 | Lane et al. .................... 700/37 |
| 4,924,418 A | 5/1990 | Backman et al. ............ 364/550 |
| 4,934,196 A | 6/1990 | Romano ................ 73/999.999 |
| 4,942,514 A | 7/1990 | Miyagaki et al. ............. 700/85 |
| 4,944,035 A | 7/1990 | Aagardl et al. .............. 364/556 |
| 4,956,793 A | 9/1990 | Bonne et al. ................ 365/558 |
| 4,964,125 A | 10/1990 | Kim ............................. 371/20 |
| 4,965,742 A | 10/1990 | Skeirik ........................ 364/513 |
| 4,980,844 A | 12/1990 | Demjanenko et al. ...... 364/550 |
| 4,992,965 A | 2/1991 | Holter et al. ......... 364/999.999 |
| 5,005,142 A | 4/1991 | Lipchak et al. ............. 364/550 |
| 5,006,992 A | 4/1991 | Skeirik ........................ 364/513 |
| 5,008,810 A | 4/1991 | Kessel et al. ................ 364/200 |
| 5,015,934 A | 5/1991 | Holley et al. ................ 318/611 |
| 5,018,215 A | 5/1991 | Nasr et al. .................... 382/15 |
| 5,043,862 A | 8/1991 | Takahashi et al. ........... 364/162 |
| 5,043,863 A | 8/1991 | Bristol et al. ................ 364/165 |
| 5,050,095 A | 9/1991 | Samad ........................ 364/513 |
| 5,053,815 A | 10/1991 | Wendell ...................... 355/208 |
| 5,070,458 A | 12/1991 | Gilmore et al. ............. 364/424 |
| 5,081,598 A | 1/1992 | Bellows et al. .............. 364/513 |
| 5,089,978 A | 2/1992 | Lipner et al. ................ 702/183 |
| 5,089,984 A | 2/1992 | Struger et al. ............... 364/200 |
| 5,094,107 A | 3/1992 | Schoch ........................ 73/570 |
| 5,098,197 A | 3/1992 | Shepard et al. .............. 374/120 |
| 5,099,436 A | 3/1992 | McCown et al. ............ 364/550 |
| 5,103,409 A | 4/1992 | Shimizu et al. .............. 364/556 |
| 5,111,531 A | 5/1992 | Grayson et al. ............. 364/513 |
| 5,121,467 A | 6/1992 | Skeirik ........................ 395/11 |
| 5,122,976 A | 6/1992 | Bellows et al. .............. 364/550 |
| 5,130,936 A | 7/1992 | Sheppard et al. ..... 364/999.999 |
| 5,134,574 A | 7/1992 | Beaverstock et al. .. 364/555.01 |
| 5,140,530 A | 8/1992 | Guha et al. .................. 395/13 |
| 5,142,612 A | 8/1992 | Skeirik ........................ 395/13 |
| 5,148,378 A | 9/1992 | Shibayama et al. ... 364/999.999 |
| 5,161,013 A | 11/1992 | Rylander et al. ............. 358/160 |
| 5,167,009 A | 11/1992 | Skeirik ........................ 395/27 |
| 5,175,678 A | 12/1992 | Frerichs et al. .............. 364/148 |
| 5,187,674 A | 2/1993 | Bonne .......................... 364/558 |
| 5,193,143 A | 3/1993 | Kaemmerer et al. .......... 395/51 |
| 5,197,114 A | 3/1993 | Skeirik ........................ 395/22 |
| 5,197,328 A | 3/1993 | Fitzgerald .................... 73/168 |
| 5,200,028 A | 4/1993 | Tatsumi ...................... 156/656 |
| 5,200,958 A | 4/1993 | Hamilton et al. .......... 371/16.4 |
| 5,210,704 A | 5/1993 | Husseiny ............. 364/999.999 |
| 5,212,765 A | 5/1993 | Skeirik ......................... 395/11 |
| 5,214,582 A | 5/1993 | Gray ................... 364/999.999 |
| 5,224,203 A | 6/1993 | Skeirik ........................ 395/22 |
| 5,228,780 A | 7/1993 | Shepard et al. .............. 374/175 |
| 5,235,527 A | 8/1993 | Ogawa et al. ........ 364/999.999 |
| 5,251,151 A | 10/1993 | Demjanenko et al. ...... 364/559 |
| 5,265,031 A | 11/1993 | Malczewski ................ 364/497 |
| 5,265,222 A | 11/1993 | Nishiya et al. ................ 395/3 |
| 5,274,572 A | 12/1993 | O'Neill et al. ............... 364/550 |
| 5,282,131 A | 1/1994 | Rudd et al. .................. 364/164 |
| 5,282,261 A | 1/1994 | Skeirik ........................ 395/22 |
| 5,291,190 A | 3/1994 | Scarola et al. .......... 340/825.06 |
| 5,293,585 A | 3/1994 | Morita ......................... 395/52 |
| 5,301,101 A | 4/1994 | MacArthur et al. ......... 364/156 |
| 5,303,181 A | 4/1994 | Stockton ...................... 365/96 |
| 5,305,230 A | 4/1994 | Matsumoto et al. ........ 364/495 |
| 5,311,421 A | 5/1994 | Nomura et al. .............. 364/157 |
| 5,311,562 A | 5/1994 | Palusamy .................... 376/215 |
| 5,315,521 A | 5/1994 | Hanson et al. ............... 364/468 |
| 5,317,520 A | 5/1994 | Castle .......................... 364/482 |
| 5,325,522 A | 6/1994 | Vaughn ....................... 364/600 |
| 5,327,357 A | 7/1994 | Feinstein et al. ............ 364/502 |
| 5,329,443 A | 7/1994 | Bonaquist et al. ............. 700/33 |
| 5,329,465 A | 7/1994 | Arcella et al. .......... 364/551.01 |
| 5,333,240 A | 7/1994 | Matsumoto et al. .......... 395/23 |
| 5,347,449 A | 9/1994 | Meyer et al. ................ 364/185 |
| 5,349,541 A | 9/1994 | Alexandro, Jr. et al. ..... 364/578 |
| 5,351,184 A | 9/1994 | Lu et al. ...................... 364/165 |
| 5,353,207 A | 10/1994 | Keeler et al. ................ 364/164 |
| 5,353,315 A | 10/1994 | Scarola et al. ............... 376/259 |
| 5,361,612 A | 11/1994 | Voiculescu et al. ............ 70/241 |
| 5,369,599 A | 11/1994 | Sadjadi et al. ............... 364/516 |
| 5,373,452 A | 12/1994 | Guha ........................... 364/550 |
| 5,384,698 A | 1/1995 | Jelinek ......................... 364/149 |
| 5,384,699 A | 1/1995 | Levy et al. ............ 364/999.999 |
| 5,386,373 A | 1/1995 | Keeler et al. ................ 364/577 |
| 5,390,287 A | 2/1995 | Obata ........................... 395/67 |
| 5,390,326 A | 2/1995 | Shah ........................... 395/575 |
| 5,394,341 A | 2/1995 | Kepner ................ 364/999.999 |
| 5,394,543 A | 2/1995 | Hill et al. .................... 395/575 |
| 5,396,415 A | 3/1995 | Konar et al. ................. 364/162 |
| 5,398,303 A | 3/1995 | Tanaka ......................... 395/51 |
| 5,400,246 A | 3/1995 | Wilson et al. ............... 364/146 |
| 5,404,064 A | 4/1995 | Mermelstein et al. ....... 310/319 |
| 5,408,406 A | 4/1995 | Mathur et al. ............... 364/163 |
| 5,408,586 A | 4/1995 | Skeirik ........................ 395/23 |
| 5,414,645 A | 5/1995 | Hirano ................ 364/999.999 |
| 5,419,197 A | 5/1995 | Ogi et al. ...................... 73/659 |
| 5,430,642 A | 7/1995 | Nakajima et al. ............ 364/148 |
| 5,440,478 A | 8/1995 | Fisher et al. ................. 364/188 |
| 5,442,544 A | 8/1995 | Jelinek ......................... 364/149 |
| 5,461,570 A | 10/1995 | Wang et al. ................. 364/468 |
| 5,467,355 A | 11/1995 | Umeda et al. ............. 371/29.1 |
| 5,469,735 A | 11/1995 | Watanabe .................. 73/118.1 |
| 5,483,387 A | 1/1996 | Bauhahn et al. ............ 359/885 |
| 5,485,753 A | 1/1996 | Burns et al. ................... 73/720 |
| 5,486,996 A | 1/1996 | Samad et al. ................ 364/152 |
| 5,488,697 A | 1/1996 | Kaemmerer et al. ........... 395/51 |
| 5,489,831 A | 2/1996 | Harris ......................... 318/701 |
| 5,499,188 A | 3/1996 | Kline et al. .................. 364/468 |
| 5,500,941 A | 3/1996 | Gil ........................ 395/183.14 |
| 5,511,004 A | 4/1996 | Dubost et al. .......... 364/999.999 |
| 5,511,442 A | 4/1996 | Tame .......................... 74/502.6 |
| 5,521,814 A | 5/1996 | Teran ........................... 364/402 |
| 5,528,510 A | 6/1996 | Kraft ............................ 716/19 |
| 5,533,413 A | 7/1996 | Kobayashi .................. 73/865.9 |
| 5,537,310 A | 7/1996 | Tanake et al. ............... 364/151 |
| 5,541,833 A | 7/1996 | Bristol et al. ................ 364/165 |
| 5,546,301 A | 8/1996 | Agrawal et al. ............. 364/140 |
| 5,548,528 A | 8/1996 | Keeler et al. ................ 364/497 |
| 5,559,690 A | 9/1996 | Keeler et al. ................ 364/165 |

| Patent | Date | Name | Class |
|---|---|---|---|
| 5,561,599 A | 10/1996 | Lu | 364/164 |
| 5,566,065 A | 10/1996 | Hansen et al. | 364/164 |
| 5,570,282 A | 10/1996 | Hansen et al. | 364/148 |
| 5,570,300 A | 10/1996 | Henry et al. | 364/999.999 |
| 5,572,420 A | 11/1996 | Lu | 364/153 |
| 5,574,638 A | 11/1996 | Lu | 364/165 |
| 5,586,066 A | 12/1996 | White et al. | 364/576 |
| 5,596,704 A | 1/1997 | Geddes et al. | |
| 5,598,521 A | 1/1997 | Kilgore et al. | 395/155 |
| 5,600,148 A | 2/1997 | Cole et al. | 250/495.1 |
| 5,602,757 A | 2/1997 | Haseley et al. | 364/999.999 |
| 5,602,761 A | 2/1997 | Spoerre et al. | 364/554 |
| 5,604,914 A | 2/1997 | Kabe | 395/800 |
| 5,610,339 A | 3/1997 | Haseley et al. | 73/660 |
| 5,623,598 A | 4/1997 | Voigt et al. | 714/47 |
| 5,625,574 A | 4/1997 | Griffiths et al. | 364/550 |
| 5,628,994 A | 5/1997 | Kaper et al. | 424/93.2 |
| 5,631,825 A | 5/1997 | Van Weele et al. | 364/188 |
| 5,640,493 A | 6/1997 | Skeirik | 395/23 |
| 5,646,350 A | 7/1997 | Robinson et al. | 73/602 |
| 5,666,297 A | 9/1997 | Britt et al. | 364/578 |
| 5,671,351 A | 9/1997 | Wild et al. | 395/183.14 |
| 5,675,504 A | 10/1997 | Serodes et al. | 364/496 |
| 5,680,409 A | 10/1997 | Qin et al. | 371/48 |
| 5,682,309 A | 10/1997 | Bartusiak et al. | 364/149 |
| 5,687,090 A | 11/1997 | Chen et al. | 364/496 |
| 5,691,895 A | 11/1997 | Kurtzberg et al. | 364/999.999 |
| 5,692,158 A | 11/1997 | Degeneff et al. | 395/500 |
| 5,698,788 A | 12/1997 | Mol et al. | 73/659 |
| 5,704,011 A | 12/1997 | Hansen et al. | 395/22 |
| 5,715,158 A | 2/1998 | Chen | 364/150 |
| 5,729,661 A | 3/1998 | Keeler et al. | 395/213 |
| 5,740,324 A | 4/1998 | Mathur et al. | 395/22 |
| 5,742,513 A | 4/1998 | Bouhenguel et al. | 364/492 |
| 5,754,451 A | 5/1998 | Williams et al. | 364/999.999 |
| 5,757,371 A | 5/1998 | Oran | 345/348 |
| 5,761,518 A | 6/1998 | Boehling et al. | 395/500 |
| 5,764,891 A | 6/1998 | Warrior | 395/200.2 |
| 5,768,119 A | 6/1998 | Havekost et al. | 364/133 |
| 5,777,872 A | 7/1998 | He | 364/149 |
| 5,781,432 A | 7/1998 | Keeler et al. | 364/164 |
| 5,781,878 A | 7/1998 | Mizoguchi et al. | 701/109 |
| 5,790,898 A | 8/1998 | Kishima et al. | 395/899 |
| 5,796,602 A | 8/1998 | Wellan et al. | 364/130 |
| 5,796,606 A | 8/1998 | Spring | 700/9 |
| 5,796,609 A | 8/1998 | Tao et al. | 364/164 |
| 5,798,939 A | 8/1998 | Ochoa et al. | 364/493 |
| 5,805,442 A | 9/1998 | Crater et al. | 364/138 |
| 5,809,490 A | 9/1998 | Guiver et al. | 706/16 |
| 5,819,050 A | 10/1998 | Boehling et al. | 395/284 |
| 5,819,232 A | 10/1998 | Shipman | 705/8 |
| 5,825,645 A | 10/1998 | Konar et al. | 364/148 |
| 5,826,249 A | 10/1998 | Skeirik | 706/25 |
| 5,838,561 A | 11/1998 | Owen | 364/152 |
| 5,842,189 A | 11/1998 | Keeler et al. | 706/16 |
| 5,847,952 A | 12/1998 | Samad | 364/148 |
| 5,848,365 A | 12/1998 | Coverdill | 701/35 |
| 5,855,791 A | 1/1999 | Hays et al. | 210/696 |
| 5,859,773 A | 1/1999 | Keeler et al. | 364/164 |
| 5,859,885 A | 1/1999 | Rusnica et al. | 376/259 |
| 5,859,964 A | 1/1999 | Wang et al. | 395/185.01 |
| 5,875,420 A | 2/1999 | Piety et al. | 702/182 |
| 5,877,954 A | 3/1999 | Klimasauskas et al. | 364/149 |
| 5,880,716 A | 3/1999 | Kunugi | 345/173 |
| 5,892,679 A | 4/1999 | He | 364/164 |
| 5,892,939 A | 4/1999 | Call et al. | 395/500 |
| 5,898,869 A | 4/1999 | Anderson | 395/652 |
| 5,901,058 A | 5/1999 | Steinman et al. | 364/130 |
| 5,905,989 A | 5/1999 | Biggs | 707/104 |
| 5,906,214 A | 5/1999 | Gueret | 132/314 |
| 5,907,701 A | 5/1999 | Hanson | 395/671 |
| 5,909,370 A | 6/1999 | Lynch | 364/148.05 |
| 5,909,541 A | 6/1999 | Sampson et al. | 395/182.04 |
| 5,909,586 A | 6/1999 | Anderson | 395/750.08 |
| 5,917,840 A | 6/1999 | Cheney et al. | 371/53 |
| 5,918,233 A | 6/1999 | La Chance et al. | 707/104 |
| 5,922,963 A | 7/1999 | Piety et al. | 73/659 |
| 5,924,086 A | 7/1999 | Mathur et al. | 706/25 |
| 5,940,290 A | 8/1999 | Dixon | 364/138 |
| 5,948,101 A | 9/1999 | David et al. | 713/2 |
| 5,949,417 A | 9/1999 | Calder | 345/342 |
| 5,951,654 A | 9/1999 | Avsan | 710/5 |
| 5,960,214 A | 9/1999 | Sharpe et al. | 395/835 |
| 5,960,441 A | 9/1999 | Bland et al. | 707/104 |
| 5,975,737 A | 11/1999 | Crater et al. | 364/138 |
| 5,984,502 A | 11/1999 | Calder | 364/188 |
| 5,988,847 A | 11/1999 | McLaughlin et al. | 364/138 |
| 5,995,916 A | 11/1999 | Nixon et al. | 702/182 |
| 5,997,167 A | 12/1999 | Crater et al. | 364/184 |
| 6,006,171 A | 12/1999 | Vines | 702/184 |
| 6,008,985 A | 12/1999 | Lake et al. | 361/686 |
| 6,014,612 A | 1/2000 | Larson et al. | 702/183 |
| 6,017,143 A | 1/2000 | Eryurek et al. | 364/148.06 |
| 6,026,352 A | 2/2000 | Burns | 702/182 |
| 6,033,257 A | 3/2000 | Lake et al. | 439/502 |
| 6,035,339 A | 3/2000 | Agraharam | 709/234 |
| 6,038,486 A | 3/2000 | Saitoh | 700/96 |
| 6,041,263 A | 3/2000 | Boston et al. | 700/32 |
| 6,047,221 A | 4/2000 | Piche et al. | 700/44 |
| 6,055,483 A | 4/2000 | Lu | 702/31 |
| 6,061,603 A | 5/2000 | Papadopoulos | 700/83 |
| 6,067,505 A | 5/2000 | Bonoyer et al. | 702/85 |
| 6,076,124 A | 6/2000 | Korowitz et al. | 710/102 |
| 6,078,843 A | 6/2000 | Shavit | 700/48 |
| 6,093,211 A | 7/2000 | Hamielec et al. | 703/12 |
| 6,106,785 A | 8/2000 | Havlena et al. | 422/109 |
| 6,108,616 A | 8/2000 | Borchers et al. | 72/183 |
| 6,110,214 A | 8/2000 | Klimasauskas | 703/2 |
| 6,122,555 A | 9/2000 | Lu | 700/9 |
| 6,128,279 A | 10/2000 | O'Neil et al. | 370/229 |
| 6,134,574 A | 10/2000 | Oberman et al. | 708/551 |
| 6,144,952 A | 11/2000 | Keeler et al. | 706/21 |
| 6,169,980 B1 | 1/2001 | Keeler et al. | 706/21 |
| 6,185,470 B1 | 2/2001 | Pado et al. | 700/104 |
| 6,197,480 B1 | 3/2001 | Iguchi et al. | 430/286.1 |
| 6,246,972 B1 | 6/2001 | Klimasauskas | 703/2 |
| 6,259,959 B1 | 7/2001 | Martin | 700/99 |
| 6,266,726 B1 | 7/2001 | Nixon et al. | 710/105 |
| 6,298,377 B1 | 10/2001 | Hartikainen | 709/223 |
| 6,298,454 B1 | 10/2001 | Schleiss et al. | 714/37 |
| 6,317,638 B1 | 11/2001 | Schreder et al. | 700/79 |
| 6,317,701 B1 | 11/2001 | Pyotsia et al. | 702/188 |
| 6,332,110 B1 | 12/2001 | Wolfe | 702/22 |
| 6,389,331 B1 | 5/2002 | Jensen et al. | 700/275 |
| 6,397,114 B1 | 5/2002 | Eryurek et al. | 364/999.999 |
| 6,400,681 B1 | 6/2002 | Bertin | 370/351 |
| 6,418,465 B1 | 7/2002 | Hirosawa | 709/206 |
| 6,421,571 B1 | 7/2002 | Spriggs et al. | 700/17 |
| 6,445,963 B1 | 9/2002 | Blevins et al. | 700/44 |
| 6,507,797 B1 | 1/2003 | Kliman et al. | 702/75 |
| 6,529,780 B1 | 3/2003 | Soergel | 700/10 |
| 6,535,769 B1 | 3/2003 | Komar | 700/14 |
| 6,549,130 B1 | 4/2003 | Joao | 340/539 |
| 6,567,718 B1 | 5/2003 | Campbell et al. | 700/121 |
| 6,571,273 B1 | 5/2003 | Shirai | 709/201 |
| 6,591,260 B1 | 7/2003 | Schwarzhoff | 707/2 |
| 6,609,040 B1 | 8/2003 | Brunnemann | 700/109 |
| 6,628,994 B1 | 9/2003 | Turicchi, Jr. et al. | 700/30 |
| 6,631,305 B2 | 10/2003 | Newmark | 702/110 |
| 6,633,782 B1 | 10/2003 | Schleiss et al. | 700/26 |
| 6,651,012 B1 | 11/2003 | Bechhoefer | 702/34 |
| 6,654,697 B1 | 11/2003 | Eryurek et al. | 702/47 |
| 6,690,274 B1 | 2/2004 | Bristol | 340/506 |
| 6,704,689 B1 | 3/2004 | Hogan et al. | 702/184 |
| 6,717,513 B1 | 4/2004 | Sandelman et al. | 340/506 |
| 6,721,609 B1 | 4/2004 | Wojsznis et al. | 700/28 |

| | | | |
|---|---|---|---|
| 6,732,191 B1 | 5/2004 | Baker | 710/1 |
| 6,738,388 B1 | 5/2004 | Stevenson et al. | 370/465 |
| 6,758,168 B2 | 7/2004 | Hoskinen et al. | 122/7 R |
| 6,760,782 B1 | 7/2004 | Swales | 709/224 |
| 6,774,786 B1 | 8/2004 | Havekost et al. | 340/517 |
| 6,813,532 B2 | 11/2004 | Eryurek et al. | 700/108 |
| 6,907,383 B2 | 6/2005 | Eryurek et al. | 702/183 |
| 2002/0022894 A1 | 2/2002 | Eryurek et al. | 709/224 |
| 2002/0029130 A1 | 3/2002 | Eryurek et al. | 702/183 |
| 2002/0067370 A1 | 6/2002 | Forney et al. | 345/733 |
| 2002/0077711 A1 | 6/2002 | Schliess et al. | 700/83 |
| 2002/0147511 A1 | 10/2002 | Eryurek et al. | 340/517 |
| 2002/0161940 A1* | 10/2002 | Eryurek et al. | 710/15 |
| 2002/0163427 A1 | 11/2002 | Eryurek et al. | 340/517 |
| 2002/0169514 A1 | 11/2002 | Eryurek et al. | 700/110 |
| 2003/0002969 A1 | 1/2003 | Risser | 414/542 |
| 2003/0009572 A1 | 1/2003 | Thurner | 709/230 |
| 2003/0014500 A1 | 1/2003 | Schleiss et al. | 709/218 |
| 2003/0028268 A1 | 2/2003 | Eryurek et al. | 709/200 |
| 2003/0195934 A1 | 10/2003 | Peterson et al. | 709/206 |
| 2004/0075689 A1 | 4/2004 | Schleiss et al. | 700/83 |
| 2004/0181364 A1 | 9/2004 | Reeves et al. | 702/182 |
| 2004/0186927 A1* | 9/2004 | Eryurek et al. | 710/12 |
| 2004/0249583 A1 | 12/2004 | Eryurek et al. | 702/47 |
| 2005/0007249 A1 | 1/2005 | Eryurek et al. | 340/511 |
| 2005/0027379 A1 | 2/2005 | Dyk et al. | 700/79 |
| 2005/0033466 A1 | 2/2005 | Eryurek et al. | 700/108 |
| 2005/0240289 A1 | 10/2005 | Hoyte | 700/49 |
| 2006/0036404 A1 | 2/2006 | Wiklund et al. | 702/183 |

FOREIGN PATENT DOCUMENTS

| | | |
|---|---|---|
| DE | 40 08 560 A1 | 9/1990 |
| DE | 44 33 593 A1 | 6/1995 |
| DE | 195 02 499 A1 | 8/1996 |
| EP | 0 122 622 | 10/1984 |
| EP | 0 377 736 | 7/1990 |
| EP | 0 413 814 | 2/1991 |
| EP | 0 487 419 | 5/1992 |
| EP | 0 594 227 | 4/1994 |
| EP | 0 362 386 | 6/1995 |
| EP | 0 626 697 | 7/1997 |
| EP | 0 624 847 | 8/1999 |
| EP | 0 964 325 | 8/2002 |
| EP | 0 961 184 | 12/2003 |
| GB | 2 294 129 | 4/1996 |
| GB | 2 294 793 | 5/1996 |
| GB | 2 347 234 A | 8/2000 |
| GB | 2 380 833 | 4/2003 |
| JP | 06242192 | 2/1994 |
| JP | 07234988 | 5/1995 |
| WO | WO98/38585 | 9/1998 |
| WO | WO 00/50851 | 8/2000 |
| WO | WO 02/023405 | 3/2002 |
| WO | WO 02/095509 A2 | 11/2002 |
| WO | WO 02/095633 | 11/2002 |
| WO | WO99/13418 | 3/2003 |
| WO | WO 03/075206 | 9/2003 |

OTHER PUBLICATIONS

"Electrical Equipment Coverage," GE Industrial Systems, available at http://www.geindustrial.com/cwc/services?id=72 on Jul. 18, 2002.
"Customer Impact," GE Industrial Systems, available at http://www.geindustrial.com/cwc/services?id=73 on Jul. 18, 2002.
"Components of GE Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
International Search Report of PCT/US02/05874, issued Nov. 13, 2002.
dotnet.za.net, "Web Services—A Guide for Business and IT Managers (Sep. 23, 2001)", (Copyright 2001), www.dotnet.za.net.
EPan Examination Report, EP 02717514.0, dated Jun. 29, 2004.
EPan Examination Report, EP 02723319.6, dated Jul. 1, 2004.
Examination Report under Section 18(3) issued in GB 0308687.9 by the United Kingdom Patent Office on Mar. 11, 2005.
First Office Action issued in Chinese Application No. 02122060.3 on Feb. 4, 2005.
First Office Action issued in Chinese Application No. 02805785.6 on Nov. 11, 2005.
First Office Action issued in Chinese Application No. 02805854.2 on Nov. 11, 2005.
Great Britain Examination Report under Section 18(3) issued Dec. 17, 2003 in Application No. GB 0126490.2.
Great Britain Examination Report under Section 18(3) issued on Sep. 16, 2004 in Application No. GB 0212610.0.
Great Britain Search Report under Section 17 performed on Dec. 11, 2002 in Application No. GB 0212610.0.
International Preliminary Examination Report issued in PCT/US02/15901, EPan Patent Office, mailed Sep. 10, 2003.
International Preliminary Examination Report issued in PCT/US02/05874, EPan Patent Office, mailed Feb. 3, 2003.
International Preliminary Examination Report issued in PCT/US02/16033, EPan Patent Office, mailed Jun. 17, 2003.
International Search Report issued in PCT/US02/06577, EPan Patent Office, mailed Nov. 13, 2002.
International Search Report for PCT/US02/15901, mailed Jun. 17, 2003.
International Search Report for PCT/US02/16033 dated Sep. 16, 2003.
International Search Report for PCT/US04/004939, issued Sep. 8, 1994.
Kalkhoff, W. "Agent-Oriented Robot Task Transformation," Proceeding of the International Symposium on Intelligent Control, IEEE, pp. 242-247 (Aug. 27, 1995).
Lighthammer Illuminator™ Manufacturing Intelligence Brochure "Now you can see all your manufacturing information from a single interface—in real-time, from anywhere."
Lighthammer Software Development, "Illuminator™ The 1st Plant Information Portal'™" (Copyright 1999).
Mazeda et al., "Supervision and Optimised Process Control in Sugar Beet Factories,"Centre of Sugar Technology, Spain from www.univreims.fr/externes/avh10mazaeda.pdf.
Search Report under Section 17 (5) issued by Great Britain Patent Office, dated Jun. 11, 2002 in Application No. GB 0126490.2 (UK 2083258).
Search Report under Section 17(5) issued in GB 0416908.2 application by the United Kingdom Patent Office, dated Oct. 13, 2004.
Search Report under Section 17 (5) issued in GB 0308687.3 by the United Kingdom Patent Office on Aug. 29, 2003.
"Status Signals of Field Instruments," NAMUR Recommendation, NA 64, Feb. 1, 2001, pp. 1-8.
Systinet, "Introduction to Web Services", (Copyright 2001, 2002), www.systinet.com.
Web Services Architect, "What are Web Services", www.webservicesarchitect.com.
Written Opinion issued in PCT/US02/15901, EPan Patent Office, mailed Jul. 16, 2003.
Written Opinion issued in PCT/US02/16033, EPan Patent Office, mailed Jul. 21, 2003.
Written Opinion of the International Searching Authority issued in PCT/US04/004939, mailed Sep. 29, 2004.
Written Opinion issued in PCT/US02/05874, EPan Patent Office, mailed Nov. 13, 2002.
Zolera Systems, "A Brief Guide to Web Services Protocols" (Copyright 2001), www.zolera.com.
Written Opinion for International Application No. PCT/US2006/029923 dated Nov. 21, 2006.
International Search Report for International Application No. PCT/US2006/029923 dated Nov. 21, 2006.

* cited by examiner

*FIG. 4*

|          | PI | VI | HI | UI |
|----------|----|----|----|----|
| Unit     | x  |    | x  | x  |
| Sub Unit | x  |    | x  | x  |
| Loop     |    | x  | x  | x  |
| Device   |    | x  | x  |    |

FIG. 6

FCCU Health: 95.8

| Device Name | Index | Description | Weight |
|---|---|---|---|
| FV-111 | 100 | Leaking | 3 |
| TI-111 | 98 | Sticktion | 3 |
| LI-111 | 90 | 40 | 3 |
| MC-101 | 95 | Will burn up in 2 weeks | 3 |
| FV-111 | 96 | 0 | 1 |

FIG. 7

FCCU Variability: 8.4

| Device Name | Index | Weight |
|---|---|---|
| FV-101 | 0 | 3 |
| TI-111 | 2 | 3 |
| LI-111 | 40 | 3 |
| FV-111 | 0 | 3 |
| FV-112 | 0 | 1 |
| TI-222 | 2 | 1 |
| FI-101 | 7 | 3 |
| TI-111 | 6 | 3 |
| LI-111 | 7 | 3 |
| FI-111 | 7 | 3 |
| FI-112 | 7 | 1 |
| TI-222 | 7 | 1 |
| Sub unit: Reboiler RB101 | 15 | 2 |
|  |  |  |

AGGREGATION OF ASSET USE INDICES WITHIN A PROCESS PLANT

FIELD OF TECHNOLOGY

The present invention relates generally to process control systems within process plants and, more particularly, to the index aggregation to determine indices at varying levels of hierarchy within and among process plants.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

In the typical plant or process, different people are involved in different functions. For example, functions associated with the process control activities, the device and equipment maintenance and monitoring activities, and the business activities such as process performance monitoring may each have a different interest in various levels of the process plant or among process plant. Process control operators generally oversee the day to day operation of the process and are primarily responsible for assuring the quality and continuity of the process operation typically affect the process by setting and changing set points within the process, tuning loops of the process, scheduling process operations such as batch operations, etc. As a result, process control operators may be primarily interested in the status of process loops, sub-unit, units and areas. Of course, this is not always the case, and process control operators may also be interested in the status of devices which may have an effect on the loops, sub-units, unit, areas, etc., for example.

On the other hand, maintenance personnel are primarily responsible for assuring that the actual equipment within the process is operating efficiently and for repairing and replacing malfunctioning equipment, use tools such as maintenance interfaces, as well and many other diagnostic tools which provide information about operating states of the devices within the process. As such, maintenance personnel may be primarily interested the status of devices and control loops, though maintenance personnel may further be interested in the status of sub-unit, units, etc.

Still further, other persons may be responsible for business applications, such as ordering parts, supplies, raw materials, etc., making strategic business decisions such as choosing which products to manufacture, what variables to optimize within the plant, etc. based on process performance measures. Likewise, managers or other persons may want to have access to certain information within the process plant or from other computer systems associated with the process plant for use in overseeing the plant operation and in making long term strategic decisions. Such persons may primarily be interested in status information pertaining to areas within a process plant, the process plant itself and even process plants that make up a business enterprise. As a result, a process plant may involve several persons interested in the status of devices, loops, sub-units, units, areas or the process plant at different hierarchical levels.

Because, for the most part, different personnel are interested in the status of different hierarchical levels within or among process plants, various systems within a process plant monitor and report the status of various devices that are connected to the process control systems of the plant, such as the relative health, performance, utilization, variability of the devices. For example, various systems may monitor the individual devices within a process plant. However, beyond the device level, the problem with this approach is that there are thousands of devices in a typical plant and the status of any single device generally cannot be used to determine the overall status of the loop, sub-unit, unit, area or process plant where the device is found.

Some solutions exist for determining the status of devices, loops, sub-units, units, area and/or plants. For example, it is currently known to provide an asset utilization expert that includes an index generation routine to generate indices related to the health, performance, utilization and variability of various plant assets at different levels of hierarchy. The creation of such indices is disclosed in Eryurek et al., U.S. Pat. No. 6,813,532 entitled "Creation and Display of Indices Within Process Plant" which was filed on Feb. 28, 2002 and issued on Nov. 2, 2004, and which is hereby expressly incorporated by reference herein. One manner in which an index could be generated by the index generation routine was to interconnect various models representing loops, sub-units, units, areas, etc. within the process plant to produce information regarding the operation of each loop, sub-unit, unit, area, etc. and generate an index from the data.

Another manner in which an index was generated by the index generation routine was to create an index for each device and create an aggregate index at least level in the system hierarchy. The aggregate index could be a weighted average or a weighted combination of the indices of the assets that made up the larger asset.

However, within a typical process plant, some assets are considered more important than other assets within a group of assets. For example, some devices are considered more critical to the larger loop, sub-unit, unit, area, etc. of which the devices are a part. If such a device were to fail, it would have more of an impact on the loop, sub-unit, unit, area, etc. than if the other devices were to fail. Such a device would therefore deserve priority over the other devices. In turn, the remaining devices may have varying degrees of importance within the loop, sub-unit, unit or area. Likewise, some loops are more important than others among a group of loops interconnected to form a sub-unit, unit, area, etc. Similar situations exist among sub-units, units, area and even among plants. The importance of assets among a group of assets may greatly affect the overall status of the group. However, in the past, the varying degrees of importance among assets were not necessarily taken into account when determining the overall status of a group of assets.

SUMMARY

A system and method of monitoring an entity having a plurality of lower level entities, is described herein, which accounts for varying degrees of importance among the lower level entities. In one aspect, use indices pertaining to status information of the lower level entities is acquired. Further, weighting values are acquired. Generally, the weighing value pertains to the importance of a lower level entity among the plurality of lower level, such as the priority or criticality of the lower level entity. The weighing values may be based on the impact and frequency of failure of the lower level entity. The impact and/or frequency of failure may, in turn, be based on maintenance information, process data, diagnostic data, on-line monitoring data and/or heuristic data. An aggregate use index representing status information regarding the entity is creating from a combination of the lower level use indices and weighting values. The aggregate use index may be an aggregate health index indicating the health of the entity, an aggregate performance index indicating the relative performance of the entity, an aggregate variability index indicating an amount of deviation of a parameter of the entity or an aggregate utilization index indicating a degree of exploitation of the entity. The combination of the lower level use indices and weighting values may be a normalized expression, such that the range of values for the use indices is the same among the lower level entities. The combination may involve creating a weighted average of the use indices of the lower level entities.

BRIEF DESCRIPTION OF THE DRAWINGS

FIG. 4 is an exemplary table that illustrates one manner in which indices may be generated for different levels of a system hierarchy;

FIG. 6 is an exemplary table that illustrates one manner in which index values may be used to calculate a new index value as a weighted average of the index values;

FIG. 7 is an exemplary table that illustrates one manner in which a variability index may be calculated for a unit;

DESCRIPTION OF THE PREFERRED EMBODIMENTS

Figure 1:
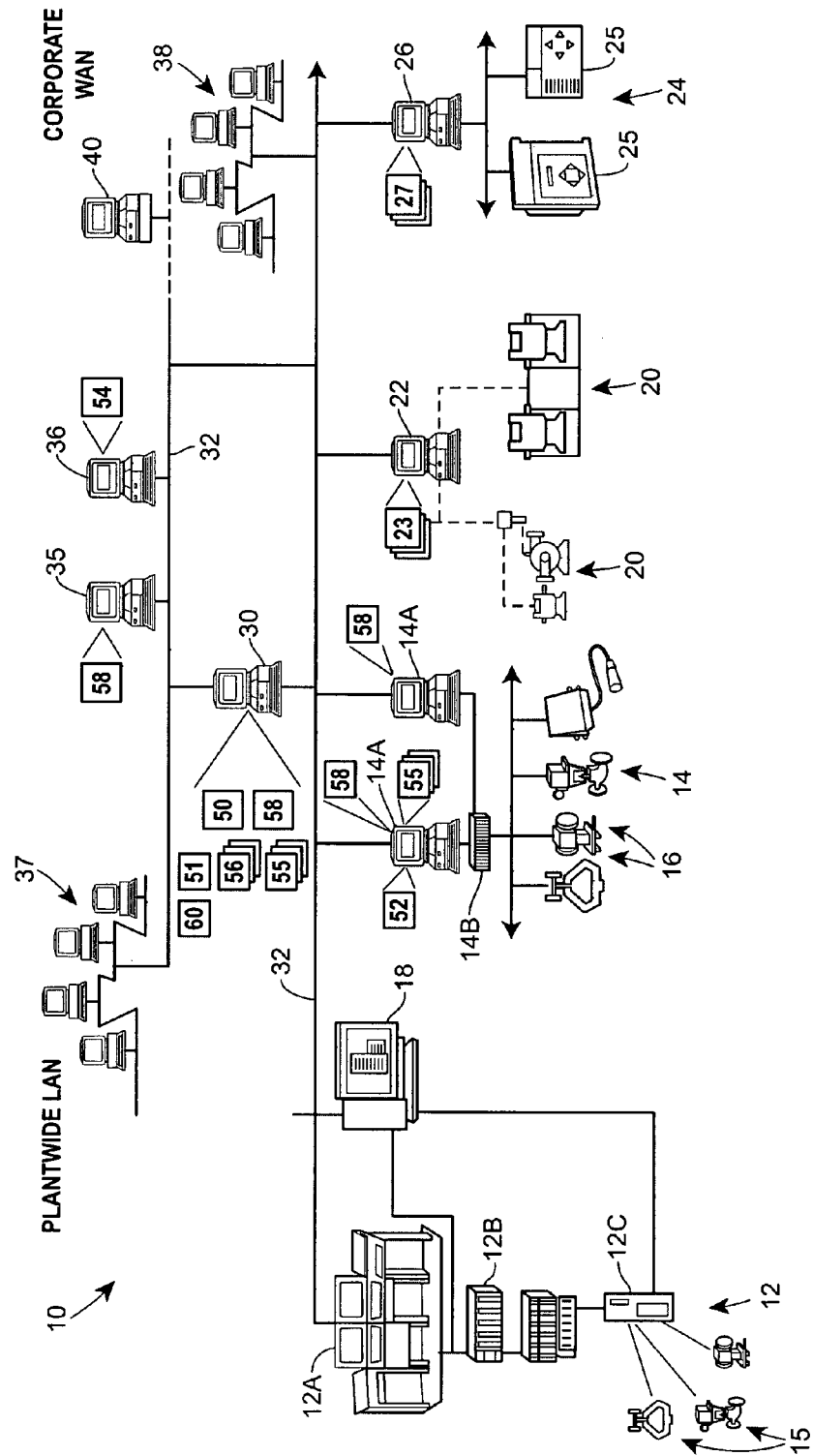
FIG. 1 is a block diagram of a process plant having an asset utilization expert configured to receive and coordinate data transfer between many functional areas of the plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFI-BUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSI Systems of Knoxville, Tenn. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), computer maintenance management systems (CMMS), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML/XSL protocol. Here, data from each of the computers 12A, 18, 14A, 22, 26, 35, 36, etc. is wrapped in an XML/XSL wrapper and is sent to an XML/XSL data server which may be located in, for example, the computer 30. Because XML/XSL is a descriptive language, the server can process any type of data. At the server, if necessary, the data is encapsulated with a new XML/XSL wrapper, i.e., this data is mapped from one XML/XSL schema to one or more other XML/XSL schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. Importantly, the asset utilization expert 50 operates as a data and information clearinghouse in the process plant 10 and is able to coordinate the distribution of data or information from one functional area, such as the maintenance area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process plant 10.

In particular, the asset utilization expert 50 may include or execute index generation software 51 that creates indices associated with devices, like process control and instrumentation devices, power generation devices, rotating equipment, units, areas, etc, or that are associated with process control entities, like loops, etc. within the plant 10. The asset utilization expert 50 may further include or execute an index aggregation routine 60. The index aggregation routine 60 utilizes indices generated by the index generation routine 51 or other index generation routines to create indices associated with various levels within a process control system, or more generally an asset utilization system, which may include one or more process control systems. The index aggregation routine 60 further includes a weighting value when creating an aggregate index associated with a process, unit, area, The index aggregation routine 60 may be provided as a separate routine or as part of the index generation routine 50.

The indices generated by the index generation routine 51 and/or the index aggregation routine 60 can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired. In one embodiment, the control expert 52 may be, for example, the control expert described in U.S. patent application Ser. Nos. 09/256,585 and 09/499,445 identified above.

Additionally, the asset utilization expert 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefore could be sent by the asset utilization expert 50. If desired, the plant 10 may also include models 56 that model certain aspects of the plant 10 and these models 56 can be executed by the asset utilization expert 50 or a control or other expert such as the control expert 52 to perform modeling functions, the purpose of which is described in greater detail in U.S. patent application Ser. No. 10/085,439 entitled "Creation and Display of Indices in a Process Plant," which was filed on Feb. 28, 2002, which is expressly incorporated by reference herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those created by and sold by MDC Technology located in Teeside, England or may be any other desired types of models. Some of the data generated by the models 56 may be used by the index generation routine 51 to generate indices which are used in other applications, such as business and process control applications.

The asset utilization expert 50 receives data as it is generated or at certain periodic times over, for example, the bus 32 or other any communication network within the process plant 10. Thereafter, periodically or as needed, the asset utilization expert 50 redistributes the data to other applications or uses that data to generate and provide other information useful in different aspects of the control or operation of the process plant 10 to other function systems within the plant 10. In particular, the asset utilization expert 50 may supply data to cause the index generation routine 51 to create a series of composite indices such as a performance index, a utilization index, a health index and a variability index associated with one or more of the devices, units, loops, areas, or other entities within the process plant 10. The generation and use of these indices will also be discussed in more detail herein.

As a result of the above discussion, it can be seen that the use of models provides many new types of data or information for the business applications, process control applications and asset maintenance and monitoring applications. In particular, the models can be used to perform performance monitoring and to produce a performance index which indicates the relative performance of a device, unit, area, etc. within a plant. This performance index may be a measure of the performance of an entity with respect to the possible performance of that entity. Furthermore, while device and unit models have been discussed above, similar models could be made and executed for process control entities, such as loops, units, etc. to provide performance measures and optimization criteria for these types of entities as well. Also, as indicated above, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indices, the asset utilization expert 50 can assist the index generation routine 51 in creating other types of indices such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization expert 50 and provided to the index generation routine 51 at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine 51 or the index aggregation routine 60.

The utilization index, in one form or another, tracks or reflects the utilization of individual devices, units, loops, or other entities and may provide some indication as to whether these entities are being over utilized or under utilized based on previously determined bench marks or operational goals. A utilization index can be generated based on measured uses of the actual device. For example, a device may be measured as to how often it is being used within a process or is being left idle and this index may be compared to a desired utilization for that entity to determine if the entity is being over or under utilized. The utilization index might identify devices, units, loops, etc. which are not being utilized as often as they could be or should be or, on the other hand, which are being utilized too much and, thus, are being over used. In some instances, a utilization index might be determined based on the business decisions made regarding the appropriate or desired use of a particular device.

Figure 2:
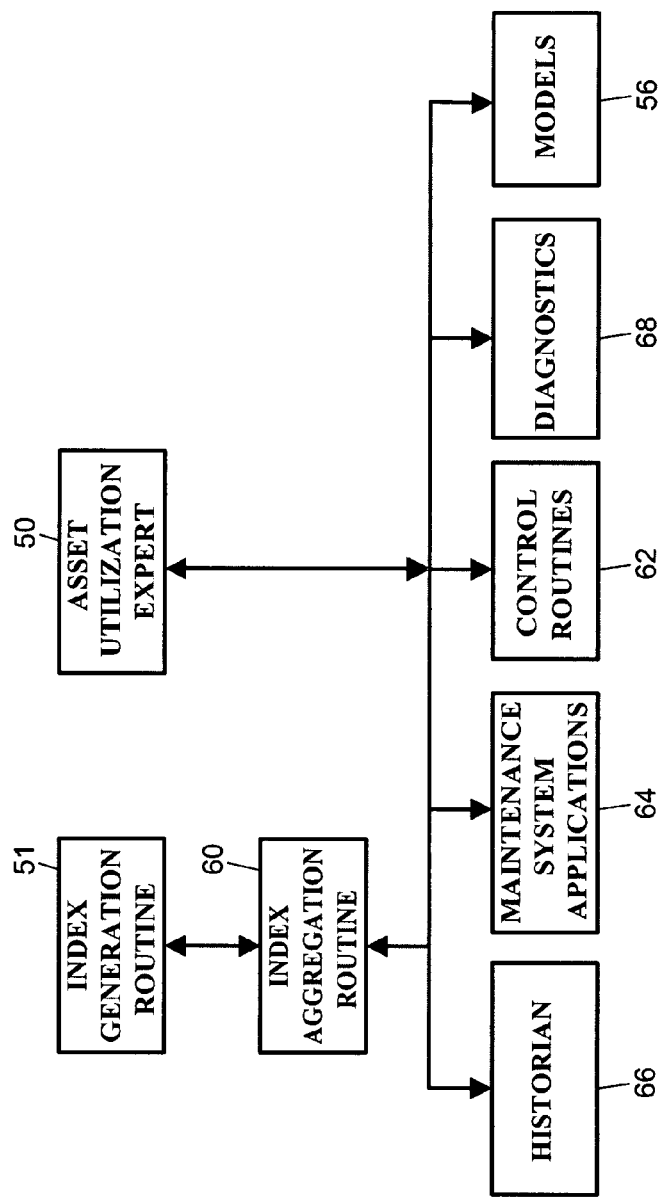
FIG. 2 is a data and information flow diagram with respect to the index aggregation routine within the plant of FIG. 1.

Referring now to FIG. 2, a data flow diagram illustrating some of the data flow between an index aggregation routine 60 and other data tools or data sources within the process plant 10 is provided. In one embodiment, an index aggregation routine 60 receives information from information sources which may run various routines and applications for providing status information regarding devices, loops, units, areas, etc. within a process plant. The index aggregation routine 60 may be incorporated with a central data collecting, sharing and distribution application, such as the asset utilization expert 50 described above which receives much of the status information from the various data tools and data sources, or provided as a separate application. The index aggregation routine 60 may be centrally located at a particular server, which may be maintained locally at the plant 10 or remotely from the plant 10. Alternatively, the index aggregation routine 60 may be distributed among several computers such as business system computers 35, maintenance computers 18, 22, maintenance planning computers 36. Furthermore, the index aggregation routine 60 may be a network application available over the Internet and/or the plantwide LAN 37 and available to various personnel through user interfaces 12A, 14A, 58.

As mentioned above, the index aggregation routine 60 receives information from various data sources, which may include data collectors, data generators or data tools including index generation routines 51, model generation routines 56, control routines 62, maintenance system applications 64, data historians 66, diagnostic routines 68, etc. In one embodiment, the index aggregation routine 60 may receive information from the asset utilization expert 50 described above, and which is described further in U.S. patent application Ser. No. 10/085,439 referred to above. This information may include indices related to the health, performance, utilization and variability of a particular device, loop, unit, area, etc. This data can take on any desired form based on how the data is generated or used by other functional systems. Still further, this data may be sent to the index aggregation routine 60 using any desired or appropriate data communication protocol and communication hardware, such as the XML/XSL protocol discussed above.

Information received from the index generation routines 51, model generation routines 56, control routines 62, maintenance system applications 64, data historians 66, diagnostic routines 68, etc. may be used to create and assign a weighting value to each of the devices within a logical and/or physical group of device. For example, each device within a logical process (e.g., control loop), sub-unit, unit, area or plant may be assigned a weighting value. Further, weighting values may be created and assigned to logical and/or physical groups including a logical process, a sub-unit, an area or a plant.

The weighting value generally relate to the importance or priority of a device, loop, sub-unit, etc. among the corresponding devices, loops, sub-units, etc. within the same physical and/or logical grouping. In other words, each asset within a group is ranked according to system criticality, operational criticality, asset criticality, etc. based upon an assessment of each asset within the group, and a weighing value is assigned to each asset based upon its importance. For example, within a sub-unit that includes a plurality of devices and/or loops, a particular piece of rotating equipment 20 may be considered more critical to the operation of the overall sub-unit than a field device 16. If both the rotating equipment 20 and the field device 16 require maintenance, the rotating equipment 20 may receive priority over the field device 16 in terms of resources allocated to maintenance. As a result, the rotating equipment 20 is assigned a weighting value greater than the weighting value assigned to the field device 16. Similarly, among the sub-units and/or units within an area, a particular sub-unit may be considered more important to the area than another sub-unit, and is weighted accordingly. It should be recognized that areas within a plant may be weighted according to importance, and plants within a business enterprise may likewise be weighted. It should further be recognized that assets within a grouping need not be limited to an immediately preceding level. For example, weighting values may be assigned to each device, loop, sub-unit and/or unit within an area, rather than just each unit within an area. Likewise, weighting values may be assigned to each device, loop, sub-unit, unit and/or area in a plant. A user may define the groupings in a manner most helpful to the user, and weighting values may be assigned accordingly. As a result, each device, loop, sub-unit, unit, area, plant, etc. may be weighted according to its importance within a particular grouping, such that each asset within a given group is assigned a weighting value.

Generally, the importance of a device, loop, sub-unit, unit, area, etc., and its corresponding weighting value, is based on two contributing factors: the impact on the group when the asset fails and the frequency of failure. For example, a device that has little impact on an area when it fails may be weighted lower than a device that has a high impact on an area during failure. Likewise, a device that has a low frequency of failure may be weighted lower than a device with a high frequency of failure. The impact and the frequency of failure may be quantified, with the product of the impact and frequency of failure resulting in the weighting value. The evaluation of impact and frequency of failure may be based on a variety of factors, including, but not limited to, process information, on-line monitoring information, historical information, maintenance information, diagnostic information, and heuristic information based on experience of process plant personnel.

The index aggregation routine 60 may acquire weighting values related to each device, loop, sub-unit, unit, area, plant, etc. within a group by receiving each weighting value from another source or by creating each weighting value based on information from a variety of sources. For example, the index aggregation routine 60 may receive data relating to the impact and frequency of failure of each device, loop, sub-unit, unit, area, plant, etc. within a group and create each weighting value based on the impact and frequency of failure, (e.g., the product of the impact and frequency of failure).

In yet another example, the index aggregation routine 60 may receive information relating to each device, loop, sub-unit, unit, area, plant, etc within a group to evaluate the impact and frequency of failure of each asset within the group, and to further create a weighting value for each asset within the group. The information may include process information, on-line monitoring information, historical information, maintenance information, diagnostic information, and heuristic information as described above. Accordingly, the index aggregation routine 60 is communicatively coupled to model generation routines 56, control routines 62, maintenance system applications 64, data historians 66, diagnostic routines 68, or other data sources as shown in FIG. 2. Each of the various types of information may be used to evaluate the impact and/or frequency of failure of an asset within a group of assets. For example, historical information, diagnostic information and maintenance information may provide information regarding previous failures of a device, while historical information, process information, on-line monitoring information and heuristic information may provide information on the impact of past failures on the group or the predicted impact of a failure on the group. Of course, it should be recognized that the weighting values may be created in a similar manner using other routines or systems within the process plant, including the asset utilization expert 50 or the index generation routine 51, or created outside the process plant.

In addition to acquiring weighting values pertaining to each device, loop, sub-unit, unit, area, plant, etc within a group, the index aggregation routine 60 acquires indices pertaining to the status of each device, loop, sub-unit, unit, area, plant, etc within the group. The indices may be acquired from the index generation routine 51, and each index may include a health index, a utilization index, a performance index or a variability index as described above. Examples of each index and its creation are described further below and described further in U.S. patent application Ser. No. 10/085,439 referred to above. However, it should be understood that various other indices may be used by the index aggregation routine 60 to determine an aggregate index for a group.

Accordingly, weighting values may be acquired by receiving the weighting values, by receiving impact and frequency of failure information to create the weighting values or by receiving information from the model generation routines 56, control routines 62, maintenance system applications 64, data historians 66, diagnostic routines 68, etc. to evaluate the impact and frequency of failure and create a weighting value for each of the devices, loops, sub-unit, units, areas and/or plants, etc. within a logical and/or physical group. Further, indices pertaining to each devices, loops, sub-unit, units, areas and/or plants, etc. within the logical and/or physical group may be acquired by the index aggregation routine 60. Using the weighting values and indices, the index aggregation routine 60 may create an aggregate index pertaining to the overall status of the group, such as an aggregate health index, an aggregate utilization index, an aggregate performance index or an aggregate variability index. The index aggregation routine 60 may calculate the aggregate index as a weighted average according to the following general equation:

$$u = \frac{\sum_{i=1}^{n} w_i u_i}{\sum_{i=1}^{n} w_i} \quad (1)$$

wherein:

u=the aggregate index of the group n=the number of assets within the group $h_i$=the index for the $i^{th}$ asset $w_i$=the weight of the $i^{th}$ asset As seen by the above equation, the aggregate index for a group is created as a normalized expression in which the range of the aggregate index is within the range of the indices used to create the aggregate index. This allows the above expression to be used with various index ranges, and allows the aggregate index to be used with various asset groups having assets of differing importance. In particular, the index value for each asset within the group is within a common range of index values and the weighting value for each asset within the group within a common range of weighting values. As a result, the aggregate index for the group will be within the same range and the range used for the indices of the assets within the group. For example, the value for $u_i$ may be a number from 0 to 100, where "0" corresponds to known use index that is low (e.g., poor health, poor performance, low utilization, high variability, etc.) and "100" corresponds to a high index (e.g., excellent health, excellent performance, high utilization, low variability, etc.). Accordingly, the aggregate index u is provided as a number from 0 to 100, which corresponds to the range of indices used by the assets within the group. Further, $w_i$ may be a number from 0 to 100, where "0" corresponds to a known, yet low, importance and "100" corresponds to a high importance.

Although the above example shows $u_i$ and $w_i$ having the same range of values, the range of values for the indices may be different from the range used for the weighting values. In some instances, an index and/or a weighting value may not be known or otherwise available for a particular asset within the group, in which case it is difficult to make assumptions about a particular asset's index and/or importance. As such, the value for $u_i$ and/or $w_i$ is set to null to avoid skewing the resulting aggregate index. In a scenario where all weighting values are zero, the aggregate index defaults to zero to avoid division by zero. The above ranges are provided as examples only, and different ranges may be used consistent with the above parameters.

In operation, the index aggregation routine 60 acquires indices pertaining to the status of each asset within a group and acquires weighting values pertaining to the importance (e.g., criticality, priority) of each asset within a particular group to create an aggregate index pertaining to the overall group. For example, an area may include several devices, loops, sub-units and units. By acquiring the health index values and weighting values for each device within the area, the overall health of the area may be determined. Alternatively, the aggregate health index of the area may be calculated based on the loops, sub-units or units within the area, or based on a combination of devices, loops, sub-units and units within the area. In turn, the index aggregation routine 60 may calculate the health index of each area within a plant, or receive the area health indices from the index generation routine 51, acquire a weighting value for each area within the plant and generate an aggregate health index corresponding to the overall health of the plant. Similar aggregate indices may be determined for loops, sub-units, units, business enterprises or at any other level of hierarchy.

In general, each of the indices generated by the index generator routine 51 may be calculated for individual devices, for logical and/or physical groupings of devices, for logical processes (e.g., control loops), for logical groupings of devices such as units and areas, plant, etc. On the other hand, each of the indices generated by the index aggregation routine 60 may be calculated based on indices provided by the index generation routine 51, based on indices previously determined by the index aggregation routine 60, or other sources of indices, and further based on weighting values associated with each of the devices, logical and/or physical groupings of devices, logical processes, units, areas, plant, etc. to calculate aggregate indices for logical and/or physical groupings of devices, for logical processes (e.g., control loops), for logical groupings of devices such as units and areas, plant, etc. In other words, the indices may, in principal, be calculated at each level of the equipment and logical hierarchy of a process control system or, more generally, an asset utilization system, which may include one or more process control systems. However, the meaning of a particular index may depend on the context (i.e., whether the index corresponds to a logical or a physical grouping of devices and/or parameters) in which the index is generated and displayed and may depend on the level of the hierarchy at which it is displayed. For example, at the lowest level of the equipment hierarchy, indices correspond to physical devices such as valves, temperature sensors, actuators, etc. Thus, each device may have a unique set of indices that may be generated within the device or for the device based on information stored within the device at the time the device is manufactured. Accordingly, each device may generate and provide its indices to higher levels of the hierarchy and to the asset utilization expert 50 as needed.

Similarly, units or loops, each of which is composed of one or more devices or function blocks may each have a unique set of indices. However, the index values for each unit or loop may be generated by mathematically combining the index values for the individual devices or function blocks used within the unit or loop. Thus, if a unit or loop is composed of a pressure transmitter, a valve and a pump (or function blocks associated with the operation of these devices), the index values for the unit or loop may be based on various mathematical combinations of the index values generated for or by each of those devices or function blocks making up the unit or the loop. Likewise, because sub-unit and unit levels of the hierarchy are composed of one or more loops which, in turn, are composed of devices, the index values for each sub-unit and unit may be generated by mathematically combining loop or device index values. Still further, area indices may be determined as combinations of the units, loops, devices, etc. within the area.

Also, generally speaking, the one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset optimization expert 50, including the index generation routine 51 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs. Of course, the user interface routine 58 may provide any user access to and enable the user to change preferences or other variables used in many or all functional areas of the plant 10.

One important aspect of the system of FIG. 1 is the user interface routines 58 which provide a graphical user interface (GUI) that is integrated with the asset utilization expert 50 described herein to facilitate a user's interaction with the various asset utilization capabilities provided by the asset utilization expert 50. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the asset utilization expert 50 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset utilization expert 50.

Generally speaking, the GUI described herein provides intuitive graphical depictions or displays of process control areas, units, loops, devices, etc. Each of these graphical displays may include numerical status and indices (some or all of which may be generated by the index generator routine 51 and the index aggregation routine 60 described above) that are associated with a particular view being displayed by the GUI. For example, a display depicting a process control area may provide a set of indices reflecting the status and performance of that area (i.e., a particular portion of the process control system at a particular level of the equipment hierarchy). On the other hand, a display depicting a loop may provide a set of status and performance indices associated with that particular loop. In any event, a user may use the indices shown within any view, page or display to quickly assess whether a problem exists within any of the devices, loops, etc. depicted within that display.

Additionally, the GUI described herein may automatically, or may in response to a request by a user, provide maintenance information to the user. The maintenance information may be provided by any portion of the asset utilization expert 50. Similarly, the GUI may display alarm information, process control information, etc., which may also be provided by the asset utilization expert 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Generally speaking, the GUI described herein provides intuitive graphical depictions or displays of process control areas, units, loops, devices, etc. Each of these graphical displays may include numerical status and performance indices (some or all of which may be generated by the index generator routine 51 described above) that are associated with a particular view being displayed by the GUI. For example, a display depicting a process control area may provide a set of indices reflecting the status and performance of that area (i.e., a particular portion of the process control system at a particular level of the equipment hierarchy). On the other hand, a display depicting a loop may provide a set of status and performance indices associated with that particular loop. In any event, a user may use the indices shown within-any view, page or display to quickly assess whether a problem exists within any of the devices, loops, etc. depicted within that display.

Additionally, the GUI described herein may automatically, or may in response to a request by a user, provide maintenance information to the user. The maintenance information may be provided by any portion of the asset utilization expert 50. Similarly, the GUI may display alarm information, process control information, etc., which may also be provided by the asset utilization expert 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Figure 3:
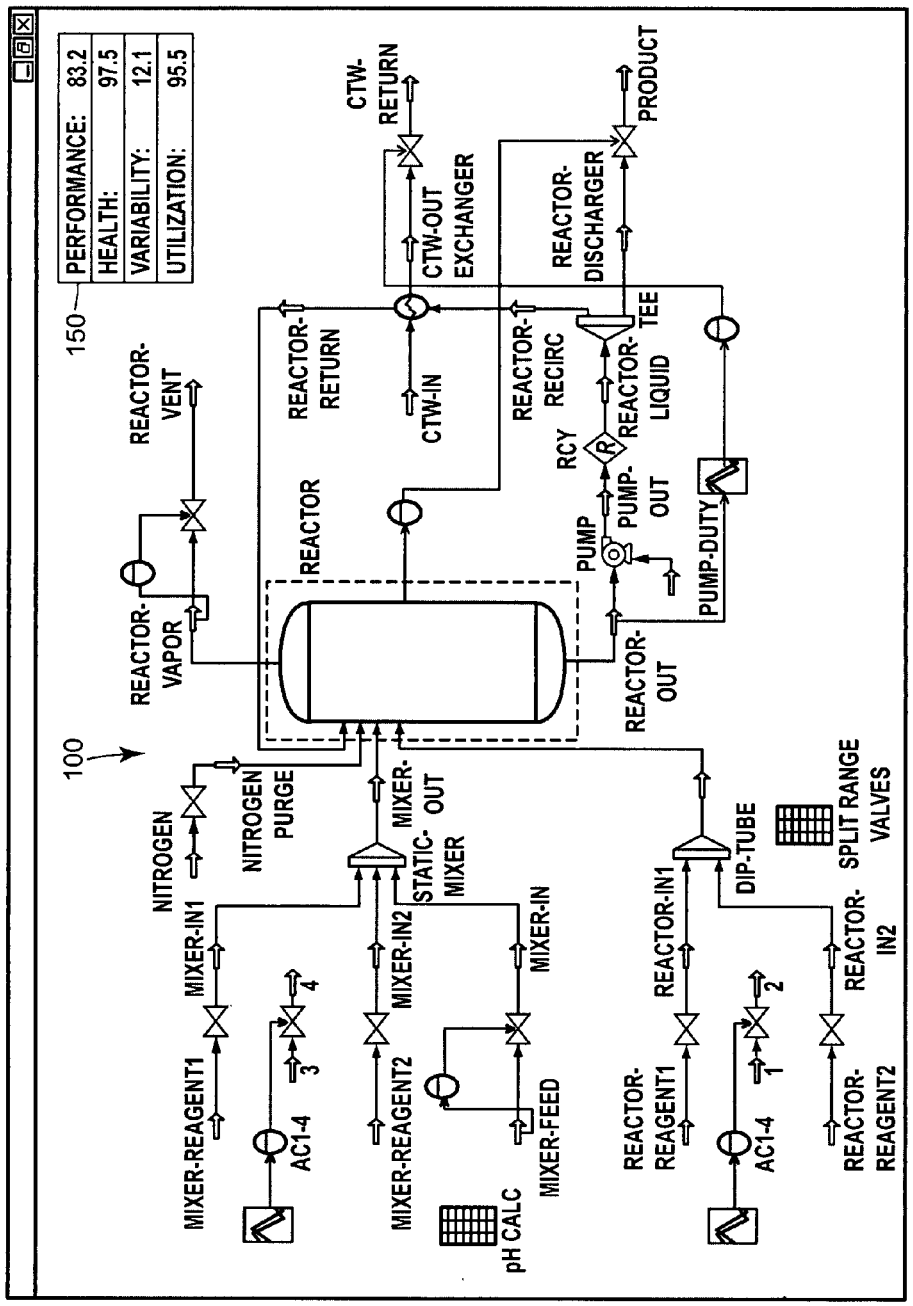
FIG. 3 is an exemplary depiction of a display representing a unit within a process control system that may be displayed by a graphical user interface.

FIG. 3 is an exemplary depiction of a display representing a unit 100 within a process control system that may be displayed by the GUI. As illustrated in FIG. 3, the unit 100 includes a plurality of devices such as, for example, valves, pumps, temperature transmitters, etc., all of which may be depicted graphically as shown. Additionally, the display may further include lines arrows, and any other indicia to represent logical and physical interconnections between the various devices. Of course, such graphical representations of process control systems (or portions of process control systems) are well known in the art and, thus, the manner of implementing these graphical representations or displays will not be described in further detail herein.

Importantly, the GUI display shown in FIG. 3 also includes a plurality of index names and values 150. In particular, the index names and values 150 include a performance index, a health index, a variability index and a utilization index, all of which have been discussed briefly above in connection with the asset utilization expert 50, the index generation routine 51 and the index aggregation routine 60. The index names and values 150 may be displayed in a tabular format as shown or in any other desired format. The index names and values 150 are representative of the performance and status of the entire unit 100 and, thus, the index values shown are preferably, but not necessarily, composed of the index values associated with each of the sub-units and/or devices that make up the unit 100.

Indices generated by the index generation routine 51 and the index aggregation routine 60, including, but not limited to a performance index, a health index, a variability index and a utilization index, may be displayed by the GUI as described in detail herein in connection with the various displays of the GUI, additional and/or different indices may be generated by the asset utilization expert 50 and displayed via the GUI without departing from the scope of the invention.

As discussed in greater detail above, the mathematical combination of device index values to form index values for loop, sub-unit, unit and area levels of the hierarchy may use weighted summations or averages, or any other suitable mathematical combination. Of course, the calculation of one or more of the performance, health, variability and utilization indices may not be appropriate, required or useful for every level of the logical and equipment hierarchies. FIG. 4 is an exemplary table that illustrates one manner in which the performance index (PI), the health index (HI), the variability index (VI) and the utilization index (UI) may or may not be generated for the device, loop, sub unit and unit levels of the system hierarchy. As shown in FIG. 4, the PI may be generated for the unit and sub unit levels. At the unit and sub unit levels, the PI may be calculated by comparing a model (such as one of the models 56) of the unit or sub unit to the actual performance of the unit or sub unit or in any other desired manner. In particular, the PI in this context (i.e., at the unit and sub unit levels of the hierarchy) may be, for example, an efficiency with respect to a theoretical maximum or, alternatively, with respect to an empirically derived maximum efficiency based on actual system performance. The table shown in FIG. 4 also indicates that the PI need not be calculated for individual devices or loops. However, in some applications it may be desirable to calculate a PI for loops and devices. For example, in the case of calculating a PI for a device, the device manufacturer may store performance information within the device so that during operation the device may calculate a PI based on a comparison of an actual performance characteristic (such as, for example, an operating efficiency) to stored performance information, which may include a theoretical maximum device efficiency. Of course, the index generation routine 51 or index aggregation routine 60 may also perform this function. In the case of calculating a PI for a loop, the system may, for example, compare the maximum or average loop error (i.e., the steady state error signal) to some predetermined minimum error value which, ideally, may be zero. In this manner, a small loop error may correspond to a PI value that is indicative of good performance.

FIG. 4 also illustrates that the VI may be calculated at the loop and device levels of the hierarchy. At the device level, the VI may be calculated by comparing the changes or deviations in a device output to an expected or desired amount of change or variation. An excessively high or an excessively low VI value may be indicative of a device failure or malfunction or possibly an imminent failure or malfunction. Likewise, at the loop level, excessively frequent or large magnitude changes in the output of a loop may be indicative of a problem. In any case, the VI for loops and devices may be based on a comparison of actual parameter variability to expected parameter variability, which may be determined theoretically or empirically. Although FIG. 4 shows that the VI may not be calculated for the unit and sub unit levels, in some applications, it may nevertheless be desirable to generate a VI for these levels.

Further, FIG. 4 shows that the HI is calculated for the device, loop, sub unit and unit levels. The HI for a device may be based on historical usage of the device. In particular, the device manufacturer may store information relating to the life cycle of the device within the device and, based on the usage of the device and the environmental impacts imparted to the device during its operation (e.g., temperature variations, shocks, etc.), the device may determine to what extent the device has moved along its life cycle curve (i.e., aged). The manufacturer may program a device to provide an HI value which is indicative of the current status of the life cycle of the device. For example, a stroke type valve may have an expected useful operating life cycle of 250,000 full stroke cycles and the manufacturer of the stroke valve device, which is typically a smart field device, has stored in its memory the expected number of lifetime operating strokes along with the current number strokes that the valve has completed. Thus, in the case where an HI value may range from between zero and ten (where zero represents poor health and ten represents perfect health), the HI value generated by the valve may range from zero to ten as the number of strokes rises from zero to 250,000. Of course, the precise relationship between the HI values and the life cycle characteristic (e.g., strokes) may not be linear. To the contrary, many life cycle characteristics follow an exponential or polynomial characteristic, whereby failure and degradation in device performance/operation progresses more rapidly as time passes, as strokes are completed, etc. Of course, there are many other manners of defining or computing an HI for a device, based on the current detected state of the device and how well it is operating. For example, if the device has two detected minor problems, its HI may decrease.

The HI for a loop, on the other hand, is preferably, but not necessarily, a mathematical combination (such as, for example, a weighted summation or average) of the HI values for the individual devices or functions blocks that make up the loop. Likewise, the HI values for the sub unit and unit levels may also be a mathematical combination of the underlying HI values for loops and sub units. Thus, ultimately, the HI values hierarchy for levels above the device level are based on one or more HI values for devices that have been formed into composite values.

As is also shown in FIG. 4, the UI may be calculated for the loop, sub unit and unit levels, but may not necessarily be calculated for the device level. Generally speaking, the UI represents the degree to which a particular asset (e.g., a loop, a sub unit or a unit) is being exploited in comparison to its capacity or desired utilization. For example, the UI value may be based on the amount of time for which a unit, sub unit or loop is being used to perform control or produce outputs. Additionally or alternatively, the UI value may be based on the amount of material which is being processed by the loop, sub unit and/or unit in comparison to the maximum amount that may be processed by that loop, sub unit, unit, etc.

Figure 5:
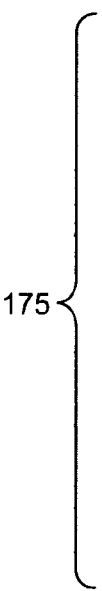
FIG. 5 is an exemplary chart depicting one manner in which a performance index for a unit may be calculated.

FIG. 5 is an exemplary chart depicting one manner in which the PI for the unit 100 shown in FIG. 3 may be calculated. As shown in FIG. 5, each of a plurality of loops 175 that make up the unit 100 has its own PI and weighting coefficient, which may be user selected or defined based on the relative importance of that particular loop to the overall operation of the unit 100. The indices and weights for the loops 175 may then be mathematically combined using the index aggregation routine 60 to arrive at a PI value of 81.8 for unit 100.

In a similar manner, the HI for the unit 100 may be calculated as a weighted average of the HI values for all of the devices (and/or loops) that make up the unit 100. A table such as that shown in FIG. 6 may be used to represent the values to be included in the weighted average. As is also shown in FIG. 6, a textual description may be associated with particular devices and index values. These textual descriptions may provide diagnostic information, maintenance information, etc. based on the HI value and the particular device associated with that HI value.

FIG. 7 is an exemplary table that illustrates one manner in which the VI may be calculated for a unit, such as the unit 500 shown in FIG. 3. As with the HI, the VI calculated for the unit 500 of FIG. 3 is based on a weighted average of the VI values for the individual devices, loops and/or sub units that make up the unit 500. Of course, the GUI may provide a user with the ability to see the weighted average data such as that illustrated in FIGS. 10-12 and may enable the user to change the weights.

Figure 8:
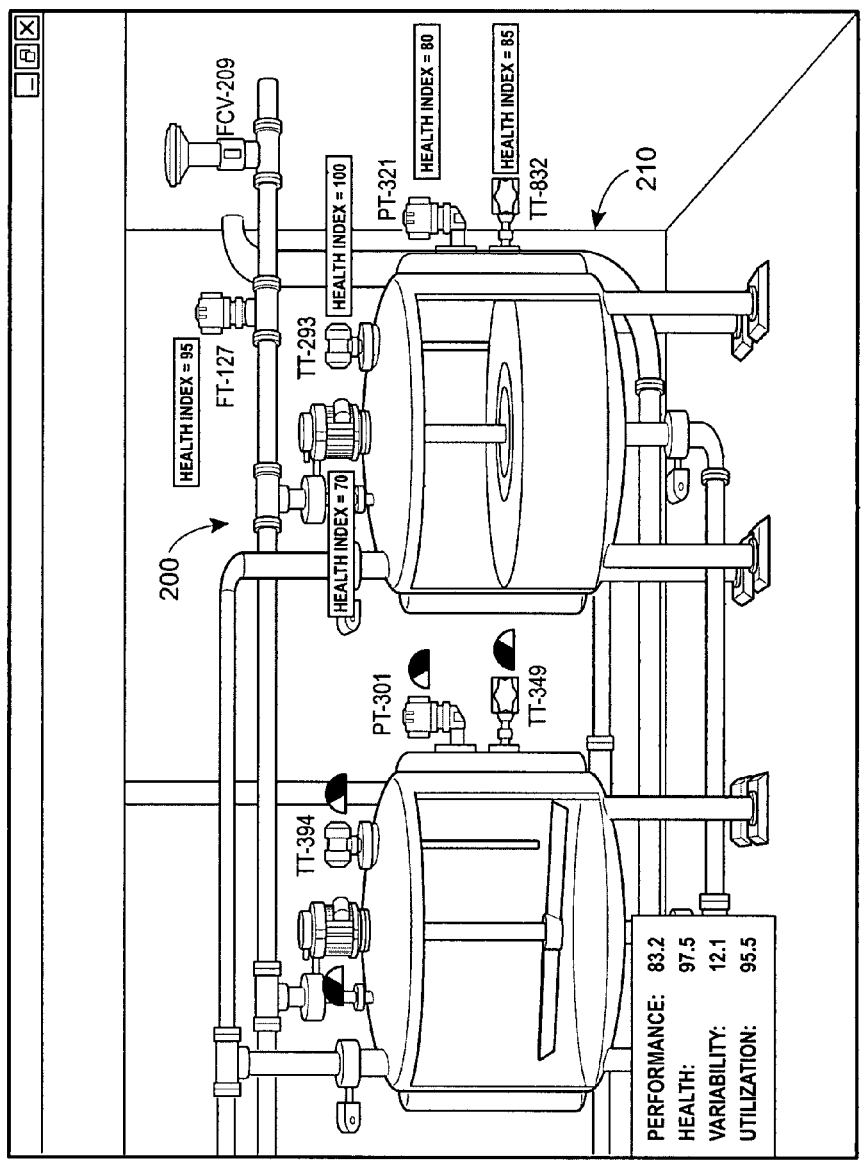
FIG. 8 is an exemplary graphical display that may be provided by a graphical user interface.

FIG. 8 is an exemplary graphical display that may be provided by the GUI to enable a user to quickly analyze the operational status and performance of a process area within the plant 10. As shown in FIG. 8, the GUI may graphically depict the physical equipment (and the interconnections therebetween) within a process area 200. Of course, it should be recognized that although a process area is depicted within the GUI display shown in FIG. 8, any other portion of the plant 10 such as, for example, a unit, sub unit, loop, device, etc. may be shown instead to achieve the same or similar results. In any event, the process area 200 is depicted as having a pair of tanks, a plurality of temperature transmitters, pressure transmitters, flow transmitters, etc. and pipes, all of which may be interconnected as shown in FIG. 8. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, one or more of the VI, HI, UI and PI values may be displayed for one or more of the devices shown within the area 200. By way of example only, the HI values for several of the devices that are connected to a tank 210 within the area 200 are displayed. However, more or fewer HI values could be displayed if desired. Additionally, different index values or groups of index values may be displayed for any of the devices that appear within the area 200 as desired. As can be appreciated from the display shown in FIG. 8, a user can quickly ascertain whether an area is performing properly and will continue to perform properly. Further, a user can also quickly identify those devices, units, sub units, etc. that may need attention and/or which may be causing a particular problem.

It will also be understood that a user may view successively lower and lower entities within a plant and be provided information about the indices associated with each of these different entities or views. Thus, for example, a user may look at a view of the plant and see a particular set of indices for the plant. The user may then focus on one area, such as by clicking on one of the areas within the plant view, and see the indices associated with that area. Similarly, by clicking on units within the displayed area, the indices for different units may be viewed. Likewise indices for loops, sub units, devices etc. may then be viewed by focusing in on these different entities from a view of an entity in which these entities are located. In this manner, a user can quickly find the cause of a lower than (or higher than) expected index at any point or level of the plant.

Figure 9:
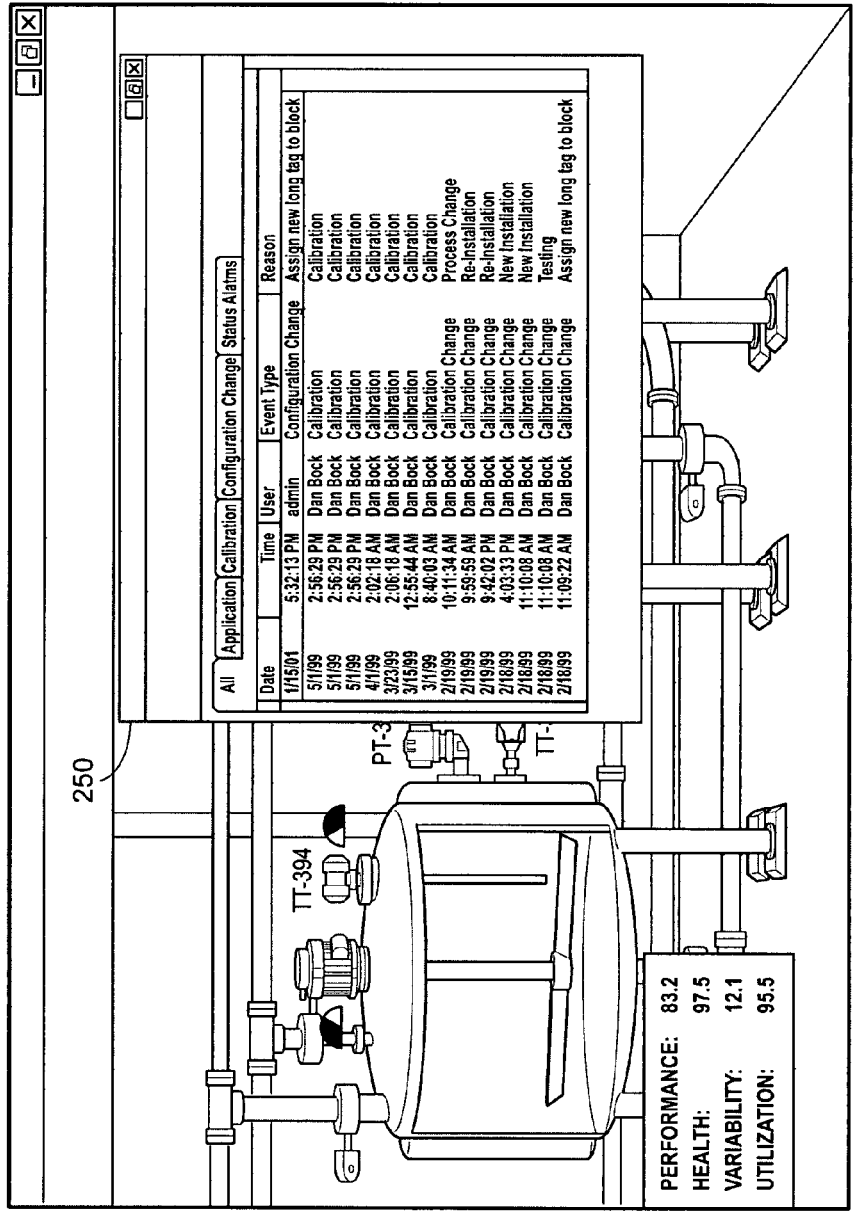
FIG. 9 is an exemplary depiction of a display that may be provided by a graphical user interface to enable a user to view audit trail information.

FIG. 9 is an exemplary depiction of a display that may be provided by the GUI to enable a user to view audit trail information in connection with any device used within the area 200. By way of example, a user may use a mouse to click on a given device or its alphanumeric identifier or, alternatively, may enter the identifier via a keyboard, to request a pop-up audit trail window 250 for that device. In this manner, a user can use the audit trail information to determine whether an improper or unacceptable index value may be related to a failure to calibrate the device properly or in a timely manner, whether a device has been configured properly or at all, etc.

Figure 10:
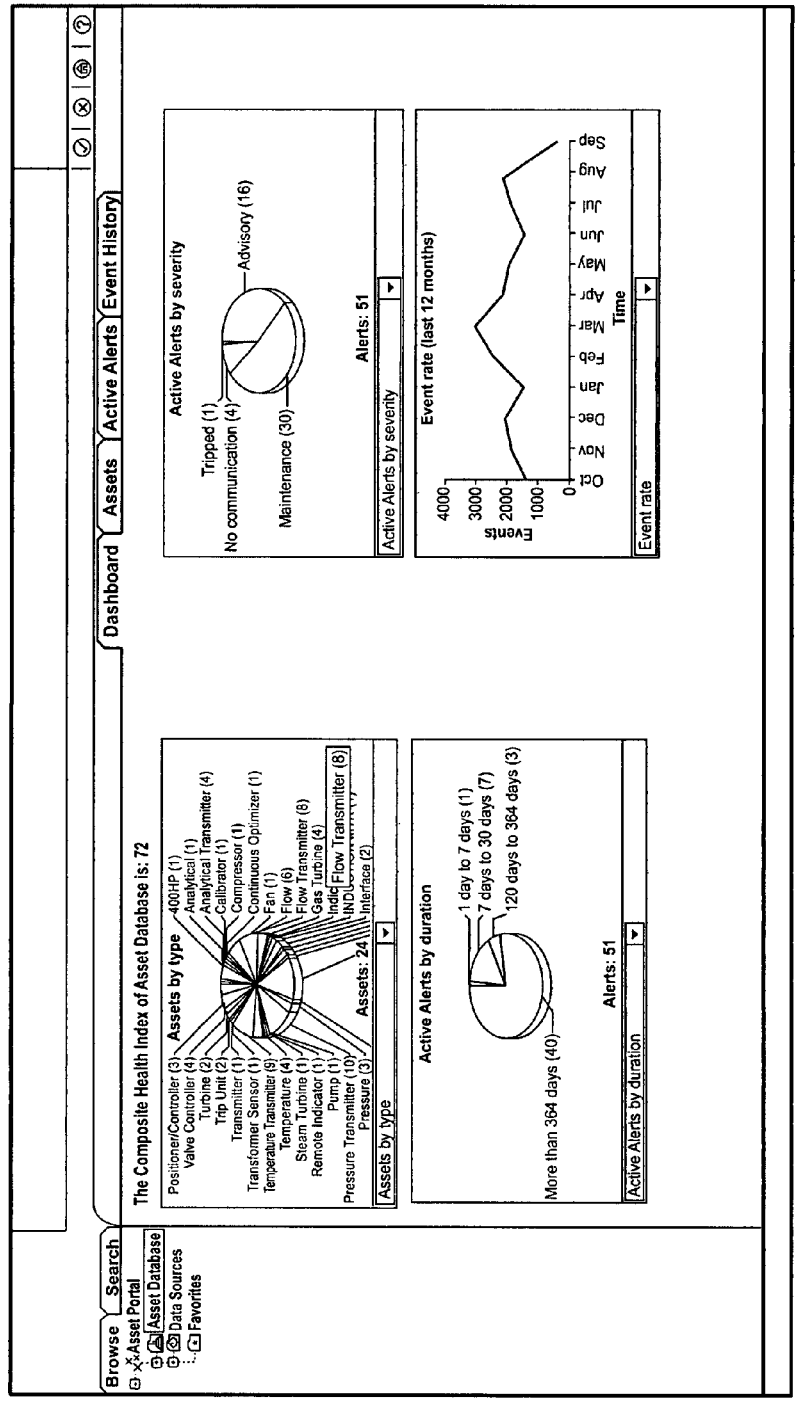
FIG. 10 is an exemplary graphical display that may be provided by a graphical user interface to enable a user to view an aggregate index.

FIG. 10 is exemplary depiction of a display that may be provided by the GUI to enable a user to view an aggregate index in connection with an area. By way of example, an aggregate health index of the area, as determined by the index aggregation routine 60, is provided at the top left of the display, with the devices of the area displayed below. A user may use a mouse to click on a given device or its alphanumeric identifier or, alternatively, may enter the identifier via a keyboard, to request a window for that device. In this manner, a user can view additional detailed information about the device, such as its weighting value, its health index, description, location, alerts, etc. to determine whether an improper or unacceptable index value associated with the area may be related to a failed device within the area.

While the asset utilization expert 50, index generation routine 51, index aggregation routine 60 and other process elements have been described as preferably being implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of monitoring an entity within a process plant wherein the entity includes a plurality of lower level entities, the method comprising:

acquiring a plurality of use indices, each use index pertaining to status information regarding one of the plurality of lower level entities;

acquiring a plurality of weighting values, each weighting value pertaining to the importance of a lower level entity among the plurality of lower level entities, and wherein each weighting value is based on the impact of the lower level entity on the entity and the frequency of failure of the lower level entity;

creating an aggregate use index from a combination of the lower level use indices and weighting values, wherein the aggregate use index represents status information regarding the entity; and storing the aggregate use index in a computer readable medium.

2. The method of claim 1, wherein each use index comprises a use index created from data pertaining to the operation of the lower level entity.

3. The method of claim 1, wherein the weighting value comprises the product of the impact of the lower level entity on the entity and the frequency of failure of the lower level entity.

4. The method of claim 1, wherein at least one of the impact of the lower level entity on the entity and the frequency of failure of the lower level entity is based on maintenance data pertaining to the lower level entity.

5. The method of claim 1, wherein at least one of the impact of the lower level entity on the entity and the frequency of failure of the lower level entity is based on process data pertaining to the lower level entity.

6. The method of claim 1, wherein at least one of the impact of the lower level entity on the entity and the frequency of failure of the lower level entity is based on diagnostic data pertaining to the lower level entity.

7. The method of claim 1, wherein at least one of the impact of the lower level entity on the entity and the frequency of failure of the lower level entity is based on on-line monitoring data pertaining to the lower level entity.

8. The method of claim 1, wherein at least one of the impact of the lower level entity on the entity and the frequency of failure of the lower level entity is based on heuristic data pertaining to the lower level entity.

9. The method of claim 1, wherein the weighting value pertains to the criticality of the lower level entity to the entity.

10. The method of claim 1, wherein the aggregate use index is an aggregate health index indicating the health of the entity.

11. The method of claim 1, wherein the aggregate use index is an aggregate performance index indicating the relative performance of the entity.

12. The method of claim 1, wherein the aggregate use index is an aggregate variability index indicating an amount of deviation of a parameter of the entity.

13. The method of claim 1, wherein the aggregate use index is an aggregate utilization index indicating a degree of exploitation of the entity.

14. The method of claim 1, wherein creating an aggregate use index comprises creating a weighted average of the use indices of the lower level entities.

15. The method of claim 1, wherein creating an aggregate use index comprises:

combining the weighting value of a lower level entity with the use index of the lower level entity to produce a combined value for each of the plurality of entities; and summing the combined values for each of the plurality of lower level entities to produce a summed value;

dividing the summed value by the sum of the plurality of weighting values.

16. The method of claim 1, wherein creating the aggregate use index comprises computing the aggregate use index as:

$$u = \frac{\sum_{i=1}^{n} w_i u_i}{\sum_{i=1}^{n} w_i}$$

wherein:

u=the aggregate use index of the higher level entity n=the number of lower level entities within the plurality of entities $u_i$=the use index of the $i^{th}$ lower level entity $w_i$=the weighting value of the $i^{th}$ lower level entity.

17. A method of monitoring an entity within a process plant wherein the entity includes a plurality of lower level entities, the method comprising:

acquiring a plurality of use indices, each use index pertaining to status information regarding one of the plurality of lower level entities;

acquiring a plurality of weighting values, each weighting value pertaining to the importance of a lower level entity among the plurality of lower level entities and wherein a range of values for the weighting value is the same among each of the plurality of lower level entities;

creating an aggregate use index from a combination of the lower level use indices and weighting values, wherein the aggregate use index represents status information regarding the entity; and storing the aggregate use index in a computer readable medium.

18. The method of claim 17, wherein each use index comprises a use index created from data pertaining to the operation of the lower level entity.

19. The method of claim 17, wherein the weighting value is based on the impact of the lower level entity on the entity and the frequency of failure of the lower level entity.

20. The method of claim 19, wherein the weighting value comprises the product of the impact of the lower level entity on the entity and the frequency of failure of the lower level entity.

21. The method of claim 19, wherein at least one of the impact of the lower level entity on the entity and the frequency of failure of the lower level entity is based on maintenance data pertaining to the lower level entity.

22. The method of claim 19, wherein at least one of the impact of the lower level entity on the entity and the frequency of failure of the lower level entity is based on process data pertaining to the lower level entity.

23. The method of claim 19, wherein at least one of the impact of the lower level entity on the entity and the frequency of failure of the lower level entity is based on diagnostic data pertaining to the lower level entity.

24. The method of claim 19, wherein at least one of the impact of the lower level entity on the entity and the frequency of failure of the lower level entity is based on on-line monitoring data pertaining to the lower level entity.

25. The method of claim 19, wherein at least one of the impact of the lower level entity on the entity and the frequency of failure of the lower level entity is based on heuristic data pertaining to the lower level entity.

26. The method of claim 17, wherein the weighting value pertains to the criticality of the lower level entity to the entity.

27. The method of claim 17, wherein the range of values for the use indices for each of the plurality of lower level entities is the same among each of the plurality of lower level entities.

28. The method of claim 17, wherein the aggregate use index is an aggregate health index indicating the health of the entity.

29. The method of claim 17, wherein the aggregate use index is an aggregate performance index indicating the relative performance of the entity.

30. The method of claim 17, wherein the aggregate use index is an aggregate variability index indicating an amount of deviation of a parameter of the entity.

31. The method of claim 17, wherein the aggregate use index is an aggregate utilization index indicating a degree of exploitation of the entity.

32. The method of claim 17, wherein creating an aggregate use index comprises creating a weighted average of the use indices of the lower level entities.

33. The method of claim 17, wherein creating an aggregate use index comprises:
combining the weighting value of a lower level entity with the use index of the lower level entity to produce a combined value for each of the plurality of entities; and
summing the combined values for each of the plurality of lower level entities to produce a summed value;
dividing the summed value by the sum of the plurality of weighting values.

34. The method of claim 17, wherein creating the aggregate use index comprises computing the aggregate use index as:

$$u = \frac{\sum_{i=1}^{n} w_i u_i}{\sum_{i=1}^{n} w_i}$$

wherein:
u=the aggregate use index of the higher level entity
n=the number of lower level entities within the plurality of
entities
$u_i$=the use index of the $i^{th}$ lower level entity
$w_i$=the weighting value of the $i^{th}$ lower level entity.

35. A method of monitoring an entity within a process plant wherein the entity includes a plurality of lower level entities, the method comprising:
acquiring a plurality of use indices, each use index pertaining to status information regarding one of the plurality of lower level entities, and wherein the range of values for the use indices for each of the plurality of lower level entities is the same among each of the plurality of lower level entities;
acquiring a plurality of weighting values, each weighting value pertaining to the importance of a lower level entity among the plurality of lower level entities and;
creating an aggregate use index from a combination of the lower level use indices and weighting values, wherein the aggregate use index represents status information regarding the entity; and
storing the aggregate use index in a computer readable medium.

36. The method of claim 35, wherein each use index comprises a use index created from data pertaining to the operation of the lower level entity.

37. The method of claim 35, wherein the weighting value is based on the impact of the lower level entity on the entity and the frequency of failure of the lower level entity.

38. The method of claim 37, wherein the weighting value comprises the product of the impact of the lower level entity on the entity and the frequency of failure of the lower level entity.

39. The method of claim 37, wherein at least one of the impact of the lower level entity on the entity and the frequency of failure of the lower level entity is based on maintenance data pertaining to the lower level entity.

40. The method of claim 37, wherein at least one of the impact of the lower level entity on the entity and the frequency of failure of the lower level entity is based on process data pertaining to the lower level entity.

41. The method of claim 37, wherein at least one of the impact of the lower level entity on the entity and the frequency of failure of the lower level entity is based on diagnostic data pertaining to the lower level entity.

42. The method of claim 37, wherein at least one of the impact of the lower level entity on the entity and the frequency of failure of the lower level entity is based on on-line monitoring data pertaining to the lower level entity.

43. The method of claim 37, wherein at least one of the impact of the lower level entity on the entity and the frequency of failure of the lower level entity is based on heuristic data pertaining to the lower level entity.

44. The method of claim 35, wherein the weighting value pertains to the criticality of the lower level entity to the entity.

45. The method of claim 35, wherein a range of values for the weighting value is the same among each of the plurality of lower level entities.

46. The method of claim 35, wherein the aggregate use index is an aggregate health index indicating the health of the entity.

47. The method of claim 35, wherein the aggregate use index is an aggregate performance index indicating the relative performance of the entity.

48. The method of claim 35, wherein the aggregate use index is an aggregate variability index indicating an amount of deviation of a parameter of the entity.

49. The method of claim 35, wherein the aggregate use index is an aggregate utilization index indicating a degree of exploitation of the entity.

50. The method of claim 35, wherein creating an aggregate use index comprises creating a weighted average of the use indices of the lower level entities.

51. The method of claim 35, wherein creating an aggregate use index comprises:

combining the weighting value of a lower level entity with the use index of the lower level entity to produce a combined value for each of the plurality of entities; and summing the combined values for each of the plurality of lower level entities to produce a summed value;

dividing the summed value by the sum of the plurality of weighting values.

52. The method of claim 35, wherein creating the aggregate use index comprises computing the aggregate use index as:

$$u = \frac{\sum_{i=1}^{n} w_i u_i}{\sum_{i=1}^{n} w_i}$$

wherein:
u=the aggregate use index of the higher level entity
n=the number of lower level entities within the plurality of entities
$u_i$=the use index of the $i^{th}$ lower level entity
$w_i$=the weighting value of the $i^{th}$ lower level entity.

53. A method of monitoring an entity within a process plant, wherein the process plant comprises a system hierarchy having a plurality of levels and a plurality of devices, the method comprising:

acquiring a plurality of use indices, each use index pertaining to the status of a device;

assigning a weighting value to each device, the weighting value pertaining to the priority of the device among the plurality of devices, and wherein the weighting value is based on the impact of the device among the plurality of devices and the frequency of failure of the device;

combining the use index and weighting values assigned to each of the devices; and creating an aggregate use index at each level of the system hierarchy from the combined use indices and weighting values; and storing the aggregate use index in a computer readable medium.

54. The method of claim 53, wherein acquiring a use index pertaining to the status of each device comprises periodically acquiring a use index from each device.

55. The method of claim 53, wherein each use index comprises a use index created from data pertaining to the operation of the device.

56. The method of claim 53, further comprising creating a use index for each device based upon data pertaining to the operation of each of the plurality of entities while each entity is in operation.

57. The method of claim 53, wherein the aggregate use index comprises a weighted average of the plurality of use indices.

58. The method of claim 53, wherein creating an aggregate use index at each level of the system hierarchy from the combined use indices and weighting values comprises utilizing a weighted sum of the use indices and the weighting values.

59. The method of claim 53, wherein creating an aggregate use index at each level of the system hierarchy from the combined use indices and weighting values comprises utilizing a weighted average of the lower level use indices.

60. The method of claim 53, wherein the use index is a performance index indicating the relative performance of the device.

61. The method of claim 53, wherein the use index is a variability index indicating an amount of deviation of a parameter of the device.

62. The method of claim 53, wherein the use index is a utilization index indicating a degree of exploitation of the device.

63. The method of claim 53, wherein the use index is a health index indicating the health of the device.

64. The method of claim 53, further comprising displaying the aggregate use index for at least one level of hierarchy of the system hierarchy.

65. A system for displaying an aggregate use indices for a process plant having a plurality of entities, the system comprising:

a processor;
a display;
a database adapted to store use indices for each of the plurality of entities, each use index pertaining to the status of the entity and adapted to store weighting values for each of the plurality of entities, each weighting value pertaining to the importance of the entity among the plurality of entities, and wherein each weighting value is based on the impact of the entity on the higher level entity and the frequency of failure of the entity;

a routine adapted to be executed by the processor which stores a representation corresponding to a higher level entity plurality of entities in the database, the higher level entity comprises the plurality of entities;

a routine adapted to be executed by the processor which generates an aggregate use index from a combination of the plurality of use indices and the plurality of weighting values, the aggregate use index pertaining to the status of the higher level entity; and a routine adapted to be executed by the processor which displays the representation and which displays the aggregate use index proximately to the corresponding representation.

66. The system of claim 65, wherein the aggregate use index comprises a weighted average of the product of each use index and each weighting value.

67. The system of claim 65, wherein the aggregate use index comprises a performance index indicating the relative performance of the higher level entity.

68. The system of claim 65, wherein the aggregate use index comprises a variability index indicating an amount of deviation of a parameter of the higher level entity.

69. The system of claim 65, wherein the aggregate use index comprises a utilization index indicating a degree of exploitation of the higher level entity.

70. The system of claim 65, wherein the aggregate use index comprises a health index indicating the health of the higher level entity.

71. The system of claim 65, wherein the representation of the higher level entity is a representation of the process plant.

* * * * *